United States Patent Office 3,333,888
Patented Aug. 1, 1967

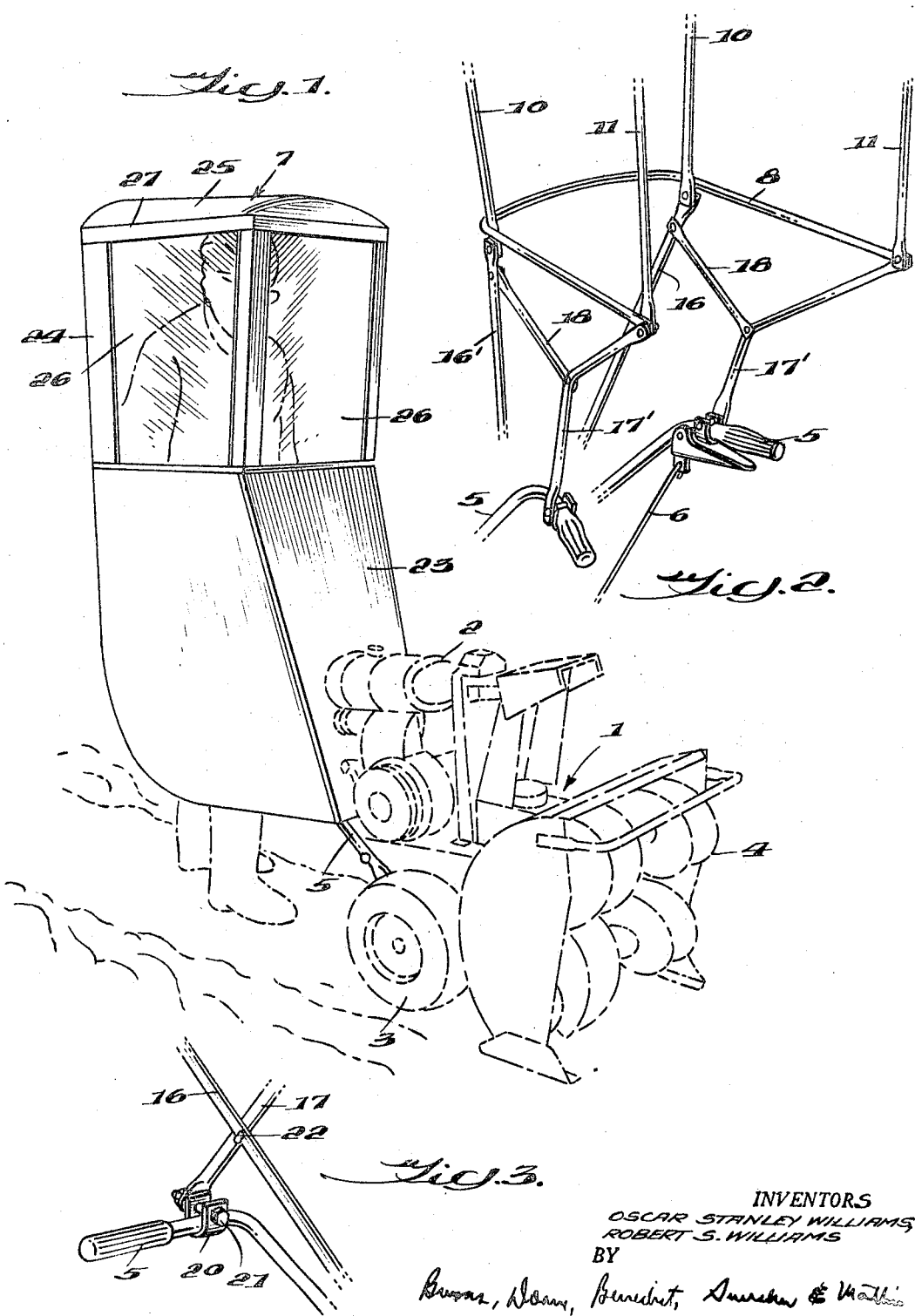

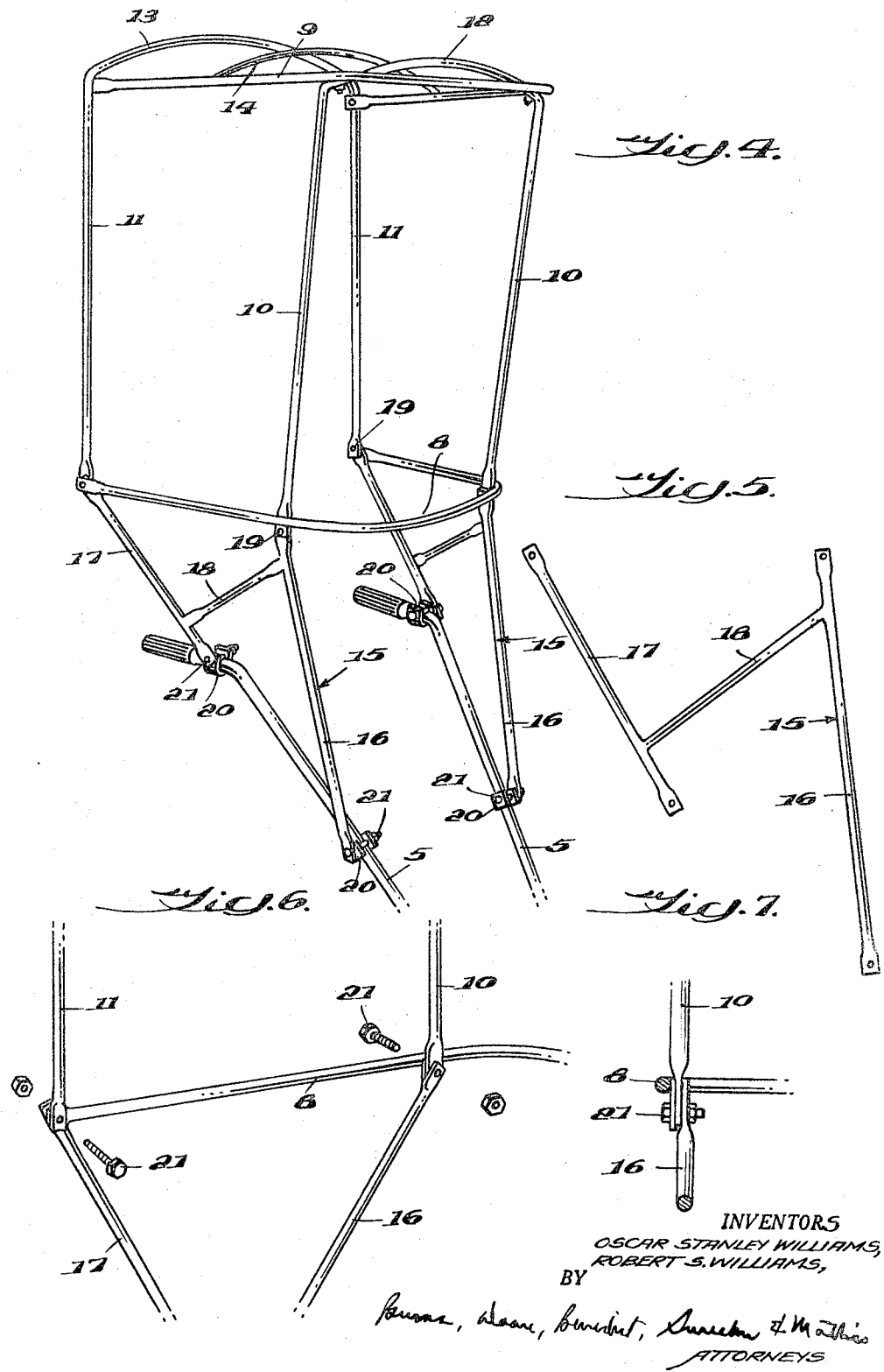

3,333,888
WALKING TRACTOR CABS
Oscar Stanley Williams and Robert S. Williams, both of
Arlington, Ind. 46104
Filed Sept. 3, 1965, Ser. No. 484,846
6 Claims. (Cl. 296—102)

This invention relates to improvements in walking tractor cabs adapted to be applied to small tractors that are operated by a walking attendant.

Many types of walking tractors are presently available for a variety of uses, including the cultivation of soil, mowing grass, blowing or shoveling snow, etc. Such tractors usually are provided with one or a pair of handle bars grasped by the operator in guiding and manipulating the tractor in its normal functions.

The operation of such tractors, either during inclement weather or in bright sunshine, may cause serious discomfort to the operator when he is open and exposed to the weather, as has been the case heretofore. This is especially true when the tractor is used for removing snow from a pathway, highway or sidewalk, for example, and especially during a snow storm when it may be needed for this purpose. It is also true if the tractor should be operated in the bright sunshine, especially during a hot summer day.

Cabs and enclosures have been provided heretofore for many different types of tractors of the riding types. However, no satisfactory cab or top enclosure has been available heretofore for tractors of the type having handle bars for guiding by a walking attendant. Such tractors have presented special problems in adapting a top enclosure or cab thereto so that the usual cabs provided for riding tractors could not be adapted to tractors of the walking type.

One object of this invention is to provide a cab or top enclosure for a tractor of the walking type and which may be mounted thereon and used to protect the operator.

Another object of the invention is to simplify and improve the construction of tractor cabs so as to enable these to be mounted on tractors of the walking type and to be applied effectively and simply to the handle bars thereof with a minimum of added weight and expense.

Still another object of the invention is to so construct a tractor cab that it may be mounted detachably on the handle bars of a tractor of the walking type and which will be braced and secured effectively to maintain its stability during operation of the tractor with effective protection for the operator.

These objects may be accomplished, according to certain embodiments of the invention, by providing a rigid frame with connections to the handle bars of a tractor of the walking type, which frame is sturdy and rigid and self-contained so as to form an effective support for covering material to enclose and protect the operator and without interfering with the normal operation of the tractor. The frame may be made of tubular members suitably secured together as by welding, bolting, etc. and which will be open at the rear so as not to interfere with the normal functioning of the tractor.

These embodiments are illustrated in the accompanying drawings, in which:

FIG. 1 is a perspective view showing the tractor cab applied to a tractor of the walking type;

FIG. 2 is a perspective view of one form of frame structure;

FIG. 3 is a similar view, showing another form of frame structure;

FIG. 4 is a perspective view of the frame structure according to FIG. 1;

FIG. 5 is a side elevation of one of the frame units therefor;

FIG. 6 is a disassembled perspective view of a mounting assembly for this frame unit; and FIG. 7 is a cross section therethrough.

Referring to FIG. 1, the invention is illustrated in connection with a tractor of the walking type, which is generally designated by the numeral 1. Many different types and forms of tractors of this character are available and known. The example illustrated has an engine, generally indicated at 2, mounted on supporting wheels 3 for driving the operating parts of the tractor. Also, this particular form of tractor has a snow blower, generally indicated at 4, for removing snow from along the pathway over which the tractor is operated.

The tractor 1 of the walking type is adapted to be guided and controlled by an operator. Accordingly, it is provided with a pair of handle bars, generally indicated at 5. Frequently, one or both of the handle bars 5 has control elements connected therewith or extending therealong such, for example, as the throttle 6 illustrated in FIG. 2.

In the normal operation of the tractor 1, the attendant walks behind the tractor, substantially between the handle bars 5, generally as illustrated in FIG. 1. During such operation, the attendant is exposed to the weather. We have provided a tractor cab, generally indicated at 7, to enclose the position of the operator and to protect him from sun, rain, snow, wind, etc.

The tractor cab 7 is provided with a supporting frame mounted on the handle bars 5, preferably detachable therefrom. One form of frame is illustrated in FIG. 4, including both the mounting brackets and the top frame assembly.

The latter comprises a horizontal bow 8 curved along the front of the cab 7 and extending along opposite sides thereof and formed usually of one piece. The bow is open at the back of the cab, as illustrated in FIG. 4, for ready access of the attendant to the interior of the cab. A corresponding top bow is illustrated at 9, located at the top of the cab. Corner posts are indicated at 10 at the front of the cab and at 11 at the rear thereof. Each of these corner posts extends upright and may be either an independent part or a section of an upright bow.

In the form illustrated in FIG. 4, the front corner posts 10 are connected together by a curved section 12 which completes an upright bow, while the rear corner posts 11 are connected together by a curved section completing the upright bow thereby. An additional rib may be provided across the top, as indicated at 14, extending between the opposite sides of the top bow 9.

These parts may be welded, bolted or otherwise secured together so as to form a top frame assembly that may be separated and removed from the mounting brackets at the bottom of the top structure. The bow 8 may be welded or otherwise secured to the top frame structure and remain as a part thereof or it may be bolted so as to be detached or secured, as desired, in the event of disassembly of the frame structure.

The top frame is supported on mounting brackets, generally indicated at 15. Each of the mounting brackets 15, in the form illustrated in FIGS. 4 and 5, comprises a pair of post members 16 and 17 connected together by a brace member 18. The brace member 18 extends between the lower end of the post 17 and the upper end of the post 16 and is shown as welded at its opposite ends to these respective posts. Other suitable secure fastening means may be used in place of the welded joint if desired, such, for example, as bolting, but in either event it should be sufficiently rigid as to make the bracket stiff in all directions.

The upper end of each bracket 16 is preferably detachably secured to the top frame. In the illustrated embodiment, the detachable connection is provided by bolts 19 extending through openings in overlapped ends of the posts 10, 11, 16 and 17. Such bolts enable the top frame to be detached and removed from the brackets and yet provide secure and effective support thereon during use of the tractor cab.

The lower ends of the posts 16 and 17 of each bracket are attached to one of the handle bars 5 at points spaced along the length thereof as, for example, adjacent the handle portion of the handle bar and approximately midway of the length of the handle bar. The attaching means illustrated comprises a U-clamp 20 which embraces the handle bar and has a bolt 21 extending therethrough and through the adjacent end of one of the posts 16 and 17 for attaching and tightening the latter to the clamp and to the handle bar. The clamp serves not only to hold the post to the clamp but also to attach the clamp and post to the handle bar by embracing the latter and being tightened thereon by the bolt. It may be turned in any direction with respect thereto. An example of this clamp is shown more in detail in FIG. 3. If a mounting bracket or bolt is provided on each handle bar this may be used to attach the side bracket thereto, in which event, an additional clamp is not required.

The mounting bracket shown in FIG. 5 is of unitary structure. If desired, however, the posts 16 and 17 can be disposed in crossed relation, as illustrated in FIG. 3, being rigidly secured together at the crossing point at 22. In that event, the intermediate brace member 18 is not required.

It is preferred that these parts be welded at 22, although bolting or riveting may be used if the joint is sufficiently rigid. By welding the bracket parts together in a welding jig, the bracket is made stiff in all directions. This keeps the cab from shifting forward and backward on the machine, and also prevents the cab structure from readily twisting in its relationship to the machine.

Another example of mounting brackets is illustrated in FIG. 2, wherein one of the posts 17' is bent intermediate the length thereof and is connected by a cross brace 18' with the other post 16'. This provides an effective support and braced structure which nevertheless may be made inexpensively and be detached for removal if desired. The posts 16' and 17' are connected with the top frame and with the handle bars, as described above.

The cab frame should be provided with suitable covering material about the lower portion thereof, as indicated generally at 23, which may be formed of canvas or other suitable material. The top frame may include portions of canvas material, as indicated at 24, with a top covering 25 fitted over the frame of the top. Transparent windows are indicated generally at 26 in the sides and front of the covering material. Such windows may be provided by suitable plastic sheets fastened to the canvas covering material fitted thereover. The top covering 25 may be attached to the side covering portions or to the windshield as by slide fasteners, as indicated at 27. This enables the factory assembled cover to be folded for packaging. Snap fasteners or other types of fastening devices may be used for attaching the covering material to the frame.

The covering material 23–26 extends over the front and along opposite sides of the cab, being open at the rear thereof for ready access of the attendant to the interior thereof and for freedom of walking movement of the attendant within the cab as he manipulates the tractor. The cab enclosure should come rearwardly along opposite sides of the handle bars 5 and enclose the handle bars within the enclosure of the cab so as to protect the operator from the weather during manipulation of the tractor.

The frame structure may be made of light weight tubular material, heavy wire, stamped from sheet metal, or made of other structure, but in any event should have sufficient stability to support the covering material effectively when mounted on the handle bars of a tractor. At the same time, this frame structure should be inexpensive and should lend itself readily to detachment of the parts for transportation in a compact assembly and to be assembled easily and quickly at the point of use. Likewise, the parts should be removable from the tractor when the cab is not required.

While the invention has been illustrated and described in certain embodiments, it is recognized that variations and changes may be made therein without departing from the invention as set forth in the claims.

We claim:

1. The combination with a tractor of the walking type having a pair of handle bar members, of a tractor cab comprising a pair of mounting brackets supported upon the respective handle bar members and extending upwardly therefrom, a top frame mounted on and detachably secured to the mounting brackets, said top frame including a plurality of upright posts secured at the lower ends thereof to the upper ends of the mounting brackets and spaced apart transversely on opposite sides of the tractor, approximately U-shaped bows extending generally horizontally between the lower ends and the upper ends respectively of the upright posts and secured thereto, and covering material extending over the top frame and around the front and sides of the mounting brackets and enclosing the handle bar members at the front and sides thereof.

2. The combination with a tractor of the walking type having a pair of handle bars, of a tractor cab comprising a pair of mounting brackets supported upon the respective handle bars and extending upwardly therefrom, means mounting each of the brackets on one of the handle bars at longitudinally spaced points thereof, a top frame mounted on and detachably secured to the mounting brackets, said top frame including a plurality of upright posts secured at the lower ends thereof to the upper ends of the mounting brackets and spaced apart transversely on opposite sides of the tractor, approximately U-shaped bows extending generally horizontally between the lower ends and the upper ends respectively of the upright posts and secured thereto, and covering material extending over the top frame and around the front and sides of the mounting brackets and enclosing the handle bars at the front and sides thereof.

3. The combination with a tractor of the walking type having a pair of handle bars, of a cab comprising a pair of mounting brackets at opposite sides of the tractor, each of said mounting brackets comprising a pair of upright post members spaced lengthwise of the handle bars, means rigidly securing the post members of each bracket together intermediate their lengths, means connecting the post members of each bracket at one end with one of the handle bars and with the mounting bracket upstanding therefrom, each mounting bracket having spaced opposite end portions at the upper end, a bow connecting the upper end portions of the mounting brackets together, and a top structure supported on the mounting brackets.

4. A tractor cab for a tractor of the walking type comprising a pair of upright mounting brackets, a bow structure connecting together the mounting brackets at the upper ends thereof, a top frame supported by the mounting brackets, said top frame including a plurality of upright posts secured at the lower ends thereof to the upper ends of the mounting brackets and spaced apart transversely on opposite sides of the tractor, approximately U-shaped bows extending generally horizontally between the lower ends and the upper ends respectively of the upright posts and secured thereto, and covering material extending about the mounting brackets and top frame for enclosing a walking space for the operator.

5. A tractor cab for a tractor of the walking type comprising a pair of upright mounting brackets, a bow structure connecting together the mounting brackets at the upper ends thereof, a top frame supported by the mounting brackets, said top frame including a plurality of upright posts secured at the lower ends thereof to the upper ends of the mounting brackets and spaced apart transversely on opposite sides of the tractor, approximately U-shaped bows extending generally horizontally between the lower ends and the upper ends respectively of the upright posts and secured thereto, covering material extending about the mounting brackets and top frame for enclosing a walking space for the operator, each of the mounting brackets comprising an upright post, and means connecting the upright posts together for bracing the mounting bracket.

6. A tractor cab for a tractor of the walking type, comprising a pair of upright mounting brackets adapted to be supported on handle members of the tractor, each of the handle members including a pair of upright posts spaced apart, and means connecting said posts together in rigid relation, a bow connecting the upper portions of the mounting brackets together, and a top structure supported on the mounting brackets, said top frame including a plurality of upright posts secured at the lower ends thereof to the upper ends of the mounting brackets and spaced apart transversely on opposite sides of the tractor, approximately U-shaped bows extending generally horizontally between the lower ends and the upper ends respectively of the upright posts and secured thereto.

References Cited
UNITED STATES PATENTS

| | | | |
|---|---|---|---|
| 691,964 | 1/1902 | Olding | 135—7.1 |
| 1,042,305 | 10/1912 | Wright | 296—78.1 |
| 1,239,916 | 9/1917 | Jose | 296—78.1 |
| 1,292,610 | 1/1917 | Jackson | 296—78.1 |
| 1,369,585 | 2/1921 | Whitney | 296—78.1 |
| 2,632,263 | 3/1953 | Cooper | 37—43 |
| 2,985,224 | 5/1961 | Sowder | 296—80 X |

FOREIGN PATENTS 236,991  7/1925  Great Britain.

BENJAMIN HERSH, *Primary Examiner.*

C. C. PARSONS, *Assistant Examiner.*